United States Patent
Carpenter et al.

(10) Patent No.: US 8,810,207 B2
(45) Date of Patent: Aug. 19, 2014

(54) COMMUNICATION SYSTEMS AND METHODS FOR TRANSMITTING COMMUNICATIONS BETWEEN A CHARGE SYSTEM AND AN AC ADAPTER

(75) Inventors: Brian Ashley Carpenter, Cary, NC (US); David Alexander Grant, Nashua, NH (US); Garry Trevor Tomlins, Glounthaune (IE); Ben A. Dowlat, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 610 days.

(21) Appl. No.: 12/948,132

(22) Filed: Nov. 17, 2010

(65) Prior Publication Data

US 2012/0119694 A1    May 17, 2012

(51) Int. Cl.
*H02J 7/00* (2006.01)
(52) U.S. Cl.
USPC ........................................... 320/140; 320/106

(58) Field of Classification Search
USPC .................................. 320/106, 140, 127, 128
See application file for complete search history.

(56) References Cited

U.S. PATENT DOCUMENTS

| | | | | |
|---|---|---|---|---|
| 6,034,504 | A | * | 3/2000 | Holcomb ...................... 320/110 |
| 6,828,760 | B2 | * | 12/2004 | Massey et al. ................ 320/127 |
| 7,679,343 | B2 | * | 3/2010 | Kokubun et al. .............. 323/268 |
| 7,719,236 | B2 | * | 5/2010 | Hartular ......................... 320/141 |
| 7,973,515 | B2 | * | 7/2011 | Densham et al. ............. 320/130 |
| 8,030,890 | B2 | * | 10/2011 | Hyatt ............................. 320/114 |
| 8,111,038 | B2 | * | 2/2012 | Wang et al. ................... 320/104 |

* cited by examiner

*Primary Examiner* — Richard V Muralidar
(74) *Attorney, Agent, or Firm* — William B. Kempler; Frederick J. Telecky, Jr.

(57) ABSTRACT

Communications systems and methods for transmitting communications between a charge system and an AC adapter are disclosed. In one embodiment, a communication system comprises an AC adapter disconnect switch that is switchable between coupling and decoupling an AC adapter DC output voltage to the charge system and a charge controller configured to modulate the AC adapter disconnect switch between coupling and decoupling to provide a communication signal to the AC adapter.

17 Claims, 3 Drawing Sheets

COMMUNICATION SYSTEMS AND METHODS FOR TRANSMITTING COMMUNICATIONS BETWEEN A CHARGE SYSTEM AND AN AC ADAPTER

TECHNICAL FIELD

This invention relates to electronics, and more specifically to communication systems and methods for transmitting communications between a charge system and an AC adapter.

BACKGROUND

Portable electronic systems (e.g., notebook computers, cellular telephone, cordless telephones mobile data terminals, radio frequency portable communication systems, etc.) typically include a rechargeable battery that is charged by a recharging unit plugged into an AC power source, when access to AC power is available. A common approach requires the use of an AC adapter, which converts the AC power to a fixed output DC voltage, and a charger function that is implemented in the end equipment. Generally, the approach commonly used requires a system where the charger function has a control function and a power conversion stage. The power conversion stage down-converts the fixed AC adapter output DC voltage by means of either a linear stage or a switching mode converter. The control functions and the charger stage implement the battery charger function that executes the battery charging process. The recharging function can be simplified and enhanced if the charger function and the AC adapter are provided with functionality that allows for communication between the charger function and AC adapter.

SUMMARY

In one aspect of the invention, a communication system is provided for transmitting communications between a charge system and an AC adapter. The communication system comprises an AC adapter disconnect switch that is switchable between coupling and decoupling an AC adapter DC output voltage to the charge system and a charge controller configured to modulate the AC adapter disconnect switch between coupling and decoupling to provide a communication signal to the AC adapter.

In another aspect of the present invention, a communication system is provided for transmitting communications between a charge system and an AC adapter. The communication system comprises an AC adapter disconnect switch that is switchable between coupling and decoupling an AC adapter DC output voltage to the charge system and a charge controller configured to modulate the AC adapter disconnect switch between coupling and decoupling to provide a communication signal to the AC adapter. The communication system further comprises a rectifier coupled in parallel with the AC adapter disconnect switch, a first end of a first inductor coupled to the rectifier and the AC adapter disconnect switch and a second end of the first inductor coupled to a capacitor. The rectifier, the first inductor and the capacitor function as an asynchronous rectifier to provide a DC device voltage from the AC adapter DC output voltage, wherein the current through the first inductor during coupling of the AC adapter disconnect switch commutates through the rectifier when the AC adapter disconnect switch is decoupled.

In yet another aspect of the invention, a method is provided for transmitting communications between a charge system located on an end equipment device and an AC adapter. The method comprises sensing an AC adapter plugged into the end equipment device and modulating an AC adapter disconnect switch between coupling and decoupling an AC adapter DC output voltage to the charge system to provide a communication signal to the AC adapter.

DETAILED DESCRIPTION

The present invention relates to communications systems and methods for transmitting communications between a charge system and an AC adapter. The charge system modulates an AC adapter disconnect switch to transmit communication signals to the AC adapter. The communication signals can include a control signal and the AC adapter can be configured to set the AC adapter output voltage and/or output current based on the control signal received from the charge system. Additionally, the AC adapter can be configured in response to the control signal to switch into sleep mode when the AC adapter output power is not needed by the charge system and/or end equipment that employs the charge system or switch into wake mode when the AC adapter output power is needed by the charge system and/or end equipment that employs the charge system.

By interaction with the system central processor unit (CPU) of the end equipment device, many other functions can be realized. For example, if the AC adapter is incapable of supporting the communications protocol, then the system CPU may consider the adapter to be counterfeit or incompatible with the end equipment device and take action, for example, disabling battery charging for safety purposes. Another use of this capability is to determine the power rating of the adapter. It is common for manufacturers to sell smaller, lighter, and less powerful AC adapters for travel purposes. These adapters cannot support both full system operation and full battery charging simultaneously. The AC adapter can transmit the adapter power rating to the system so the system can set power management settings (system performance and battery charging) compatible with the AC adapter rating.

The present invention provides the advantage that it does not require an additional wire in the AC adapter cable and thus does not require changing the interface of the AC adapter and/or charger to provide communications between the AC adapter and the charger. Therefore, implementation of the present invention can be accomplished without any additional costs and/or modifications to the AC adapter and/or charger.

Figure 1:
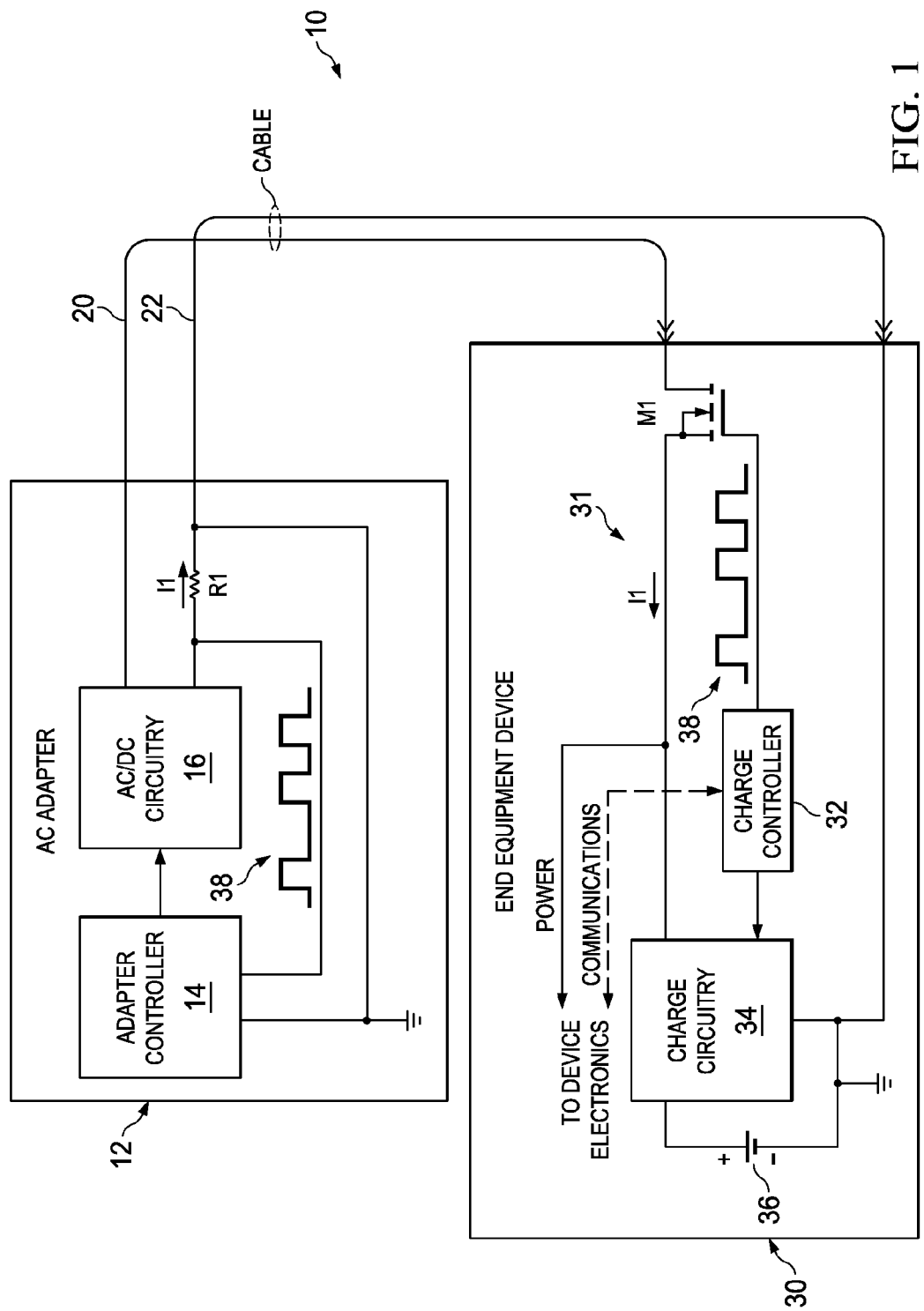
FIG. 1 illustrates a representative schematic of a communication system for transmitting communications between a charge system and an AC adapter in accordance with an aspect of the present invention.

FIG. 1 illustrates a representative schematic of a communication system 10 for transmitting communications between a charge system and an AC adapter in accordance with an aspect of the present invention. The communication system 10 includes an end equipment device 30 that includes a charging system 31 configured to charge an electrical energy storage device 36. The electrical energy storage device 36 can be one or more rechargeable batteries, primary batteries, supercapacitors or fuel cells in addition to other rechargeable electrical energy storage systems. The end equipment 30 can be, for example, a laptop computer, a mobile phone, a personal digital assistant (PDA) or the like. The electrical energy storage device 36 could be implemented as one or more rechargeable batteries, such as one or more lithium ion batteries (Li-ion), a lithium ion polymer (Li-ion polymer), nickel-metal hydride batteries (NiMH), nickel-cadmium batteries (Ni-Cad), etc.

The charge system 31 includes a charge controller 32 that controls charge circuitry 34 for charging the electrical energy storage device 36 and an adapter disconnect switch M1. The adapter disconnect switch M1 is typically included in rechargeable electrical energy storage end equipment devices for safety purposes. The charge controller 32 is configured to monitor the charge and/or charging of the electrical energy storage device 36, turn the charge circuitry 34 on when the electrical energy storage device 36 needs charging and turn the charge circuitry 34 off when the electrical energy storage device 36 is fully charged. The charge controller 32 is further configured to turn the adapter disconnect switch M1 on and off. In this manner, the charge controller 32 can modulate the adapter disconnect switch M1 and provide a communication signal 38 over either a first connection wire 20 that provides an AC adapter DC output voltage path or a second connection wire 22 that provides a return path to the AC adapter 12. The charge controller 32 can be further configured to provide communications with other device electronics, such as a system CPU to allow functions as discussed above. In normal operation, the adapter disconnect switch is on to provide power from the AC adapter DC output voltage to the other device electronics.

The AC adapter 12 includes a sense resistor R1 coupled to the second connection wire 22 and the AC/DC circuitry 16. Alternatively, the sense resistor R1 can be coupled in series with the first connection wire 20. The AC adapter 12 further comprises an adapter controller 14 that measures the voltage across the sense resistor R1 to determine the presence or absence of current flowing to the end equipment device 30 and to set the amount of current flowing to the end equipment device 30. It is to be appreciated that the use of a sense resistor is only one example of a technique for measuring current and that the AC adapter can employ a variety of other techniques for measuring the presence or absence of current flowing to the end equipment device 30. The adapter controller 14 can be further configured to receive the communication signal 38 over the first or second connection wire 20 and 22 from the charge system 31 and to set the voltage and/or charge current to be provided to the charge system 31 by controlling the AC/DC circuitry 16.

Furthermore, the adapter controller 14 can be configured to enter or exit a sleep mode based on the communication signal received from the charge system 31. The adapter controller 14 can send acknowledgements or low-speed signaling by raising or lowering the adapter output voltage by a pre-determined amount to indicate ones and zeroes. The adapter controller 14 can be further configured to provide adapter power ratings and/or other manufacturing information to the charge controller 32, which can be relayed to the system CPU.

Figure 2:
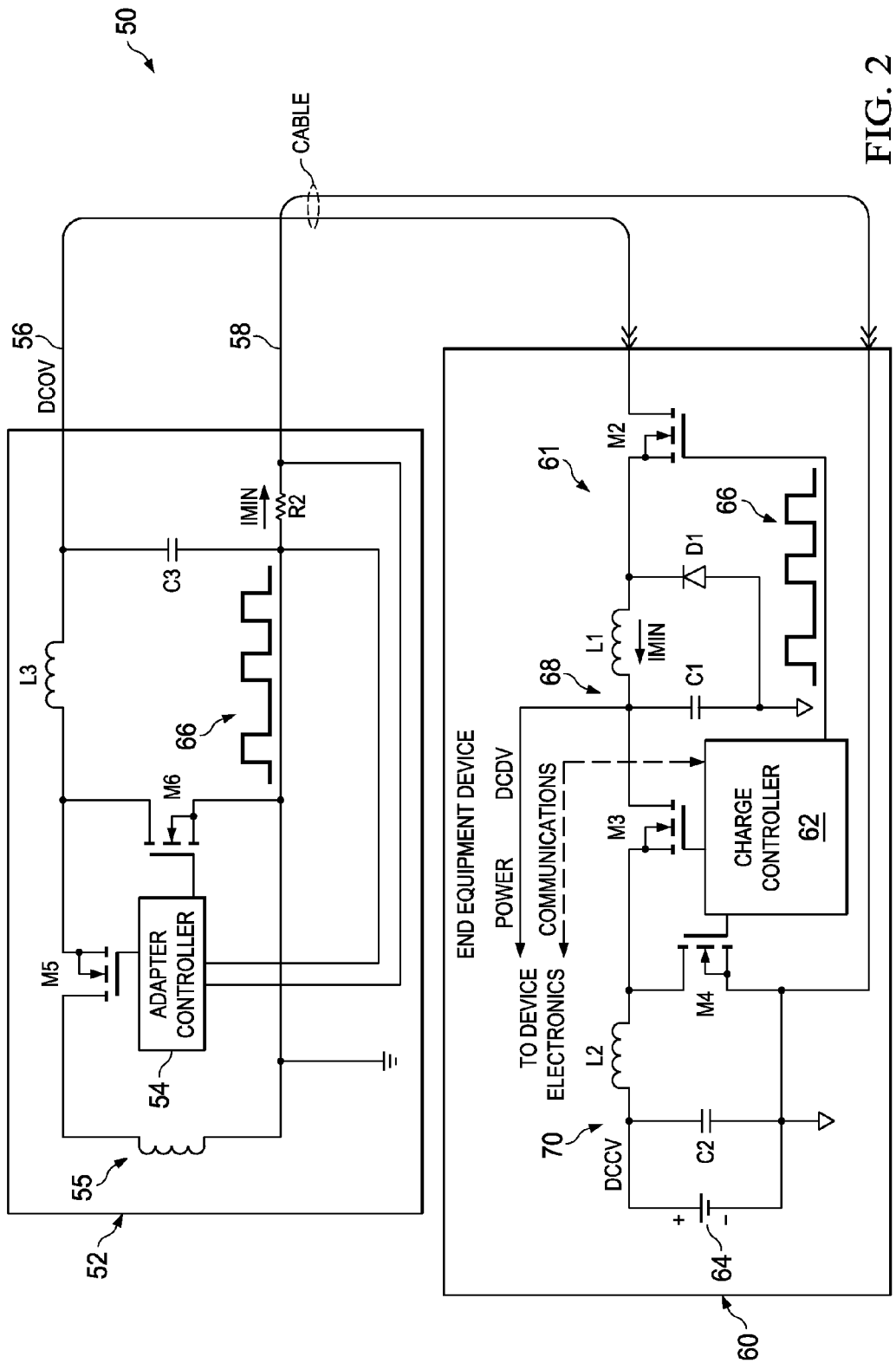
FIG. 2 illustrates a representative schematic of another communication system for transmitting communications between a charge system and an AC adapter in accordance with an aspect of the present invention.

FIG. 2 illustrates a representative schematic of another communication system 50 for transmitting communications between a charge system and an AC adapter in accordance with an aspect of the present invention. The system 50 includes an end equipment device 60 that includes a charging system 61 configured to charge an electrical energy storage device 64. The charge system 61 includes a charge controller 62 that controls charge circuitry for charging the electrical energy storage device 64 and an adapter disconnect switch M2. The charge controller 62 is configured to monitor the charge and/or charging of the electrical energy storage device 64, turn the charge circuitry on when the electrical energy storage device 64 needs charging and turn the charge circuitry off when the electrical energy storage device 64 is fully charged. The charge controller 62 is further configured to turn the adapter disconnect switch M2 on and off. In this manner, the charge controller 62 can modulate the adapter disconnect switch M2 and provide a communication signal over either a first connection wire 56 that provides an AC adapter DC output voltage path or a second connection wire 58 that provides a return path to the AC adapter 52.

The charge circuitry includes a diode D1, a first charge inductor L1 and a first charge capacitor C1 coupled to the adapter disconnect switch M2. The first charge inductor L1 and the diode D1 are the only two additional components that do not reside in some charge systems that can be provided to allow for communications to be transmitted between the charge system 61 and the AC adapter 52. The diode D1 is prevents the voltage at the adapter disconnect switch M2 from spiking when the adapter disconnect switch M1 is opened. It is to be appreciated that the present example employs a diode but the diode can be another type of rectifier, such as a synchronous rectifier or the like. Many charge systems already have inductor L1 for electromagnetic interference (EMI) filtering requirements; however, for the purpose of digital communication, the value may need to be increased. The adapter disconnect switch M2, the diode D1, the first charge inductor L1 and the first charge capacitor C1 form an asynchronous rectifier, such that the charge controller 62 can provide a DC device voltage (DCDV) at a first node 68 based on an AC adapter DC output voltage (DCOV) when the adapter disconnect switch M2 is closed. The DC device voltage can be the same or different than the AC adapter DC output voltage. After the charge controller 62 opens the adapter disconnect switch M2, the current in the first charge inductor L1 commutates through diode D1, such that the diode D1 acts as a flywheel diode of an asynchronous buck converter.

The charge circuitry also includes a first charge field effect transistor (FET) M3, a second charge FET M4, a second charge inductor L2 and a second charge capacitor C2 that form a synchronous rectifier. The charge controller 62 can control the switching of the first and second charge FETs M3 and M4 to provide a DC charge voltage (DCCV) from the DC device voltage, such that a DC charge voltage and charge current is provided at a second node 70 for charging the electrical energy storage device 64. The DC charge voltage can be the same or different than the DC device voltage and/or the AC adapter DC output voltage. It is to be appreciated that in some applications, the second charge FET M4, the second charge inductor L2 and the second charge capacitor C2 can be eliminated to reduce the number of components in the charge system 61.

The AC adapter 52 includes a sense resistor R2 coupled to the second connection wire 58. Alternatively, the sense resistor R2 can be coupled in series with the first connection wire 56. The AC adapter 52 further comprises an adapter controller 54 that measures the voltage across the sense resistor R2 to determine whether or not current is flowing to the end equipment device 60 and to set the DC voltage and/or current provided to the end equipment device 60. The AC adapter 52 includes a transformer that includes a primary winding (not shown) and a secondary winding 55 to provide a rectified unregulated voltage. The AC adapter 52 also includes a first adapter FET M5, a second adapter FET M6, a first adapter inductor L3 and a first adapter capacitor C3 that form an adapter synchronous rectifier. The adapter controller 54 can control the switching of the adapter synchronous rectifier to provide the AC adapter DC output voltage on the first connection wire 56. The AC adapter controller 54 can be further configured to receive the communication signal 66 over the first or second connection wire 56 and 58 from the charge system 61 and to set the voltage and/or charge current to be provided to the charge system 61 by controlling the switching of the first adapter FET M5 and the second adapter FET M6. Furthermore, the adapter controller 54 can be configured to enter or exit a sleep mode based on the communication signal received from the charge system 61. Additionally, the adapter controller 54 can be configured to execute other commands generated by other device electronics (e.g., system CPU) and relayed through the charge controller 62. In addition, the adapter controller 54 can be configured to provide data to the system CPU, such as for example, adapter rating, manufacturing information such as date and lot code, and other information associated with the AC adapter 52.

The charge system 61 and the AC adapter controller 54 can sense when the AC adapter 52 is plugged into the end equipment device 60. The charge system 61 can detect when the AC adapter 52 is plugged into the end equipment device 60 via a voltage sensor (not shown) on the input. The charge controller 62 responds by charging the electrical energy storage device 64 with current $I_{MIN}$ provided by the AC adapter 52. The charge controller 62 knows the current both into the electrical energy storage device 64 and into the device electronics. If the device current is $\geq I_{MIN}$, then no charge current is necessary. The adapter controller 54 also senses this current using current sense resistor R2. After an appropriate time, the charge controller 62 opens the adapter disconnect switch M2. The current in the first charge inductor L1 commutates through diode D1. The current through the sense resistor R2 drops to zero, which is sensed by the adapter control 54. This can be determined to be a logic zero by the adapter controller 54. When the adapter disconnect switch M2 closes again, the current rises to $I_{MIN}$ or higher, including device current and capacitor charging currents. This can be determined to be a logic one by the adapter controller 54.

In this manner, the charging system 61 can modulate the AC adapter disconnect switch M2 to transmit a communication signal 66 to the AC adapter 52. The AC adapter 52 via the adapter controller 54 can be configured to set the AC adapter DC output voltage and/or output current based on the communication signal 66 received from the charge system 61, or enter or exit a sleep mode when the AC adapter DC output power is not needed or is needed by the charge system 61 and/or end equipment device electronics, or perform other functions including, but not limited to, those described above. The adapter controller 54 can send acknowledgements or low-speed signaling by raising or lowering the adapter DC output voltage by a pre-determined amount to indicate ones and zeroes.

The charge controller 62, knowing the system and battery current can determine if the adapter DC output voltage surges and/or sags are as a result of system dynamics, or a signal from the adapter. The adapter signaling voltage range should be sufficiently broad to eliminate power-line transients from causing false bits. The parameter $I_{MIN}$ sets the signal-to-noise ratio at the AC adapter 52. It is expected that this method can achieve a data rate in the order of about 1 kHz to about 10 kHz. In this case, a signal length of 8 bytes will take no more than about 64 ms.

Figure 3:
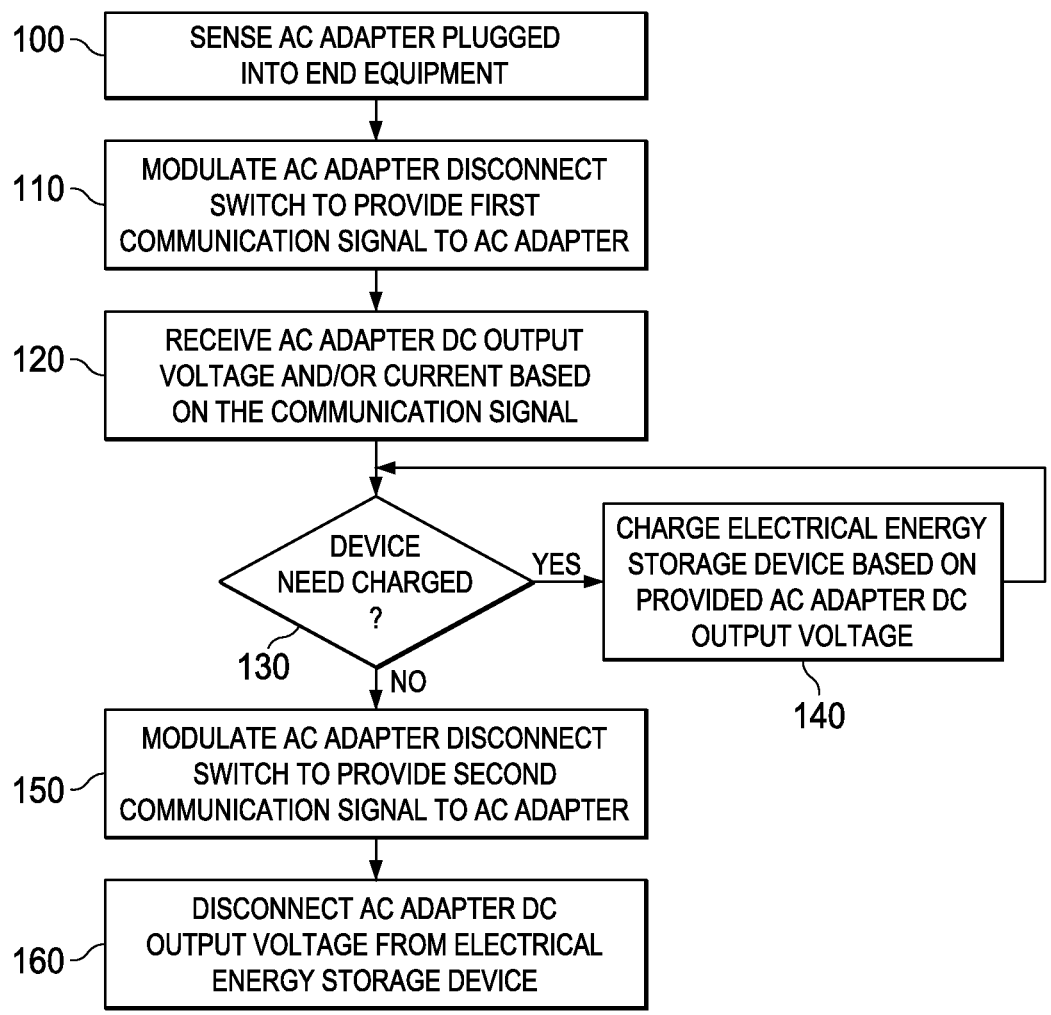
FIG. 3 illustrates a methodology for charging an electrical energy storage device in accordance with an aspect of the invention.

In view of the foregoing structural and functional features described above, a methodology will be better appreciated with reference to FIG. 3. It is to be understood and appreciated that the illustrated actions, in other embodiments, may occur in different orders and/or concurrently with other actions. Moreover, not all illustrated features may be required to implement a method.

FIG. 3 illustrates a methodology for charging an electrical energy storage device in accordance with an aspect of the present invention. At 100, an AC adapter plugged into an end equipment device is sensed. At 110, an AC adapter disconnect switch is modulated to provide a first communication signal to the AC adapter. The first communication signal can include a control signal to instruct the AC adapter to program the AD adapter DC output voltage and/or current to a first predetermined value. At 120, the AC adapter DC output voltage and/or current based on the first communication signal is received. The methodology then proceeds to 130. At 130, a determination is made on whether or not the electrical energy storage device needs to be charged. If it is determined that the electrical energy storage device needs to be charged (YES), the methodology proceeds to 140. At 140, the electrical energy storage device is charged based on the provided AC adapter DC output voltage. This methodology then repeats the determination at 130 and the charging at 140 until the electrical energy storage device does not need to be charged.

If it is determined that the electrical energy storage device does not need to be charged (NO), the methodology proceeds to 150. At 150, the AC adapter disconnect switch is modulated to provide a second communication signal to the AC adapter. The second communication signal can include a control signal to instruct the AC adapter to program the AC adapter DC output voltage and/or current to a second predetermined value. For example, since the electrical energy storage device does not need to be charged, a reduced AC adapter DC output voltage and/or current can be employed to power the end equipment electronics. At 160, the AC adapter DC output voltage is disconnected from the electrical energy device.

It is to be appreciated that this is one example of a methodology that could be employed by modulation of the AC adapter disconnect switch to generate communication signals to AC adapters, and that a variety of different communication control signals, protocols, and methodologies can be employed based on the modulation of the AC adapter disconnect switch to provide communication signals to AC adapters and the end equipment device electronics.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A communication system for transmitting communications between a charge system and an AC adapter, the communication system comprising:
    an AC adapter disconnect switch that is switchable between coupling and decoupling an AC adapter DC output voltage to the charge system; and
    a charge controller configured to modulate the AC adapter disconnect switch between coupling and decoupling to provide a communication signal to the AC adapter, wherein the communication signal comprises a control signal that instructs the AC adapter to provide manufacturing information as well as one of a desired AC adapter DC output voltage and/or current, enter a sleep mode, exit a sleep mode, and provide an adapter rating.

2. The communication system of claim 1, wherein the communication signal is transmitted over one of an AC adapter output voltage path and a return path of the AC adapter.

3. The communication system of claim 1, further comprising a rectifier coupled in parallel with the AC adapter disconnect switch, a first end of a first inductor coupled to the rectifier and the AC adapter disconnect switch and a second end of the first inductor coupled to a capacitor; the rectifier, the first inductor and the capacitor functioning as an asynchronous rectifier to provide a DC device voltage from the AC adapter output voltage, wherein the current through the first inductor during coupling of the AC adapter disconnect switch commutates through the rectifier when the AC adapter disconnect switch is decoupled.

4. The communication system of claim 3, further comprising a first field effect transistor (FET) coupled to the second end of the first inductor, a second FET series coupled to the first FET, a first end of a second inductor coupled between the first and second FETs and a second end of the second inductor coupled to a second capacitor, such that the first and second FETs, the second inductor and the second capacitor form a synchronous rectifier that provided a DC charge voltage to an electrical energy storage device based on the DC device voltage and the switching of the first and second FETs by the charge controller.

5. The communication system of claim 1, wherein the AC adapter comprises a sense resistor coupled in series with one of an AC adapter DC output voltage path and a return path and providing a voltage indicative of an AC adapter DC output current to the charge system.

6. The communication system of claim 5, further comprising an adapter controller configured to measure the voltage across the sense resistor to determine the AC adapter DC output current provided to the charge system.

7. The communication system of claim 6, wherein the adapter controller is configured to determine the communication signal by determining the presence and absence of voltage across the sense resistor and to one of provide a desired AC adapter output voltage and/or current, enter a sleep mode and exit a sleep mode based on the communication signal determination.

8. The communication system of claim 7, wherein the adapter controller is configured to transmit at least one of acknowledgements and low-speed signaling by raising and/or lowering the AC adapter DC output voltage.

9. A communication system for transmitting communications between a charge system and an AC adapter, the communication system comprising:
an AC adapter disconnect switch that is switchable between coupling and decoupling an AC adapter DC output voltage to the charge system;
a charge controller configured to modulate the AC adapter disconnect switch between coupling and decoupling to provide a communication signal to the AC adapter; and
a rectifier coupled in parallel with the AC adapter disconnect switch, a first end of a first inductor coupled to the rectifier and the AC adapter disconnect switch and a second end of the first inductor coupled to a capacitor; the rectifier, the first inductor and the capacitor functioning as an asynchronous rectifier to provide a DC device voltage from the AC adapter output voltage, wherein the current through the first inductor during coupling of the AC adapter disconnect switch commutates through the rectifier when the AC adapter disconnect switch is decoupled and wherein the communication signal comprises a control signal that instructs the AC adapter to provide manufacturing information as well as one of a desired AC adapter DC output voltage and/or current, enter a sleep mode, exit a sleep mode, and provide an adapter rating.

10. The communication system of claim 9, wherein the communication signal is transmitted over one of an AC adapter DC output voltage path and a return path of the AC adapter.

11. The communication system of claim 9, wherein the AC adapter comprises a sense resistor coupled in series with one of an AC adapter DC output voltage path and a return path and providing a voltage indicative of an AC adapter DC output current to the charge system.

12. The communication system of claim 11, further comprising an adapter controller configured to measure the voltage across the sense resistor to determine the AC adapter DC output current provided to the charge system.

13. The communication system of claim 12, wherein the adapter controller is configured to interpret the communication signal by determining the presence and absence of voltage across the sense resistor and to one of provide a desired AC adapter DC output voltage and/or current, enter a sleep mode and exit a sleep mode based on the communication signal.

14. A method for transmitting communications between a charge system located on an end equipment device and an AC adapter, the method comprising:
sensing an AC adapter plugged into the end equipment device; and
modulating an AC adapter disconnect switch between coupling and decoupling an AC adapter DC output voltage to the charge system to provide a communication signal to the AC adapter, wherein the communication signal comprises a control signal that instructs the AC adapter to provide manufacturing information as well as one of a desired AC adapter DC output voltage and/or current, enter a sleep mode, exit a sleep mode, and provide an adapter rating.

15. The system of claim 14, further comprising measuring a voltage across a sense resistor of the AC adapter to determine the AC adapter DC output current provided to the charge system.

16. The method of claim 15, further comprising interpreting the communication signal by determining the presence and absence of voltage across the sense resistor and one of providing a desired AC adapter output voltage and/or current, enter a sleep mode and exit a sleep mode based on the communication signal.

17. The method of claim 16, further comprising transmitting one of acknowledgements and/or low-speed signaling by raising and/or lowering the AC adapter DC output voltage.

* * * * *